US010425348B2

(12) United States Patent
Keller et al.

(10) Patent No.: US 10,425,348 B2
(45) Date of Patent: Sep. 24, 2019

(54) STATELESS NETWORK FUNCTIONS (71) Applicant: The Regents of the University of Colorado, a body corporate, Denver, CO (US)

(72) Inventors: Eric Keller, Louisville, CO (US); Blake Caldwell, Boulder, CO (US); Murad Kablan, Boulder, CO (US)

(73) Assignee: THE REGENTS OF THE UNIVERSITY OF COLORADO, Denver, CO (US)

(*) Notice: Subject to any disclaimer, the term of this patent is extended or adjusted under 35 U.S.C. 154(b) by 473 days.

(21) Appl. No.: 15/220,129

(22) Filed: Jul. 26, 2016

(65) Prior Publication Data
US 2017/0026301 A1    Jan. 26, 2017

Related U.S. Application Data

(60) Provisional application No. 62/195,591, filed on Jul. 22, 2015.

(51) Int. Cl.
| H04L 12/863 | (2013.01) |
| H04L 29/08 | (2006.01) |
| H04L 12/879 | (2013.01) |
| G06F 9/48 | (2006.01) |

(52) U.S. Cl.
CPC .......... *H04L 47/621* (2013.01); *G06F 9/4843* (2013.01); *H04L 49/901* (2013.01); *H04L 67/2876* (2013.01)

(58) Field of Classification Search
CPC .................................................... H04L 47/621
USPC ............................................................ 709/202
See application file for complete search history.

(56) References Cited

U.S. PATENT DOCUMENTS

| 2015/0106420 A1* | 4/2015 | Warfield | ............. H04L 41/5041 709/201 |
| 2016/0337481 A1* | 11/2016 | Smedberg | ........... G06F 17/2235 |

* cited by examiner

*Primary Examiner* — Sm A Rahman
*Assistant Examiner* — Emad Siddiqi
(74) *Attorney, Agent, or Firm* — Bryan Cave Leighton Paisner LLP (57) ABSTRACT

Systems and methods are described for stateless network function virtualization. Embodiments operate in context of a data network, in which network middleboxes are virtualized, for example, for added scalability and fault tolerance. The virtualized middleboxes can implement state-reliant network functions in a manner that decouples the state from the packet processing pipeline, while maintaining reliability and throughput even at very high data rates. Various embodiments include novel packet processing pipeline architectures, novel thread coordination structures (e.g., including batching and buffer pool sub-structures), novel remote state data store structures, and/or other novel features.

20 Claims, 8 Drawing Sheets

STATELESS NETWORK FUNCTIONS

GOVERNMENT RIGHTS STATEMENT

This invention was made with government support under grant numbers CNS1320389 and CCF1337399 awarded by the National Science Foundation. The government has certain rights in the invention.

FIELD

Embodiments relate generally to communications networks, and, more particularly, to stateless implementations of network functions in communications networks.

BACKGROUND

Modern communications networks typically include a number of network appliances, including so-called "middleboxes," In recent years, middleboxes have become a prevalent and important component in modern network infrastructures. Middleboxes typically perform various types of traffic manipulation as routers, firewalls, network address translators, and the like. Middleboxes can provide datacenter and enterprise network operators with an ability to deploy new network functionality as add-on components, which can directly inspect, modify, and block or re-direct network traffic. This, in turn, can help increase the security and/or performance of those networks.

While some conventional middleboxes are deployed as physical appliances, middleboxes are increasingly being virtualized. For example, with the introduction of Network Functions Virtualization (NFV), many network functions (e.g., firewalls, network address translators, and load balancers), which formerly ran on proprietary hardware, now are implemented in software (e.g., on commodity servers in a virtualized environment). In general, moving away from fixed physical appliances can add elastically to the network, which can allow the network to scale as needed (on demand) and to quickly recover from failure. For example, rather than implementing network functions on underutilized devices (e.g., with 5-20% utilization), which can still become overloaded to the point of failure with large swings in demand, a NFV-based infrastructure can be quickly and efficiently scaled as needed. This can help avoid business failures and/or other undesirable outcomes.

However, full virtualization benefits, such as increased elasticity and failure recovery, may not be achievable unless the network can freely launch new instances of functions and reassign traffic to those instances. While this type of virtualization can be relatively straightforward for some types of network functions, middlebox functions have proven rife with difficulty. In particular, middlebox functions tend to rely on a state locked into the network function. For example, firewalls often rely on maintaining connection information states, network address translators often rely on maintaining address mapping states, load balancers often rely on maintaining server selection mapping states, etc. Maintaining such states can depend on any packet for a given flow of traffic passing through a same network function instance every time. State reliance can tend to limit such network functions' ability to be elastic, to be failure resilient, and to handle other challenges, such as asymmetric/multi-path routing and middlebox software updates.

BRIEF SUMMARY

Among other things, embodiments are described herein for stateless network function virtualization. Embodiments operate in context of a data network, in which network middleboxes are virtualized, for example, for added scalability and fault tolerance. The virtualized middleboxes can implement state-reliant network functions in a manner that decouples the state from the packet processing pipeline, while maintaining reliability and throughput even at very high data rates. Various embodiments include novel packet processing pipeline architectures, novel thread coordination structures (e.g., including batching and buffer pool substructures), novel remote state data store structures, and/or other novel features.

For example, embodiments can coordinate receipt and queuing of data packets from a data network into multiple parallel threads (parallel processing pipelines) associated with a virtualized state-reliant network function. The threads can process the queued packets by parsing the packets to decode their contents and generating keys, accordingly, for accessing related state data. The keys can be used to generate state requests, which can be sent to a thread coordination subsystem. The thread coordination subsystem can batch the state requests into coordinated state requests, which it can communicate to a remote state data store. Coordinated state responses can be received from the remote state data store, and the threads can access e.g., point to) the responses. The threads can use the retrieved state data to further process the packets according to the virtualized state-reliant network function, and can output the processed packets to the data network.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention.

In recent years, middleboxes have become a prevalent and important component in modern network infrastructures. While some conventional middleboxes are deployed as physical appliances, middleboxes are increasingly being virtualized. For example, Network Functions Virtualization (NFV) is being used to implement certain functions in software on commodity servers in a virtualized environment. In general, moving away from fixed physical appliances can add elastically and resilience to the network, which can allow the network to scale as needed (on demand) and to quickly recover from failure. However, these virtualization benefits have proven difficult to achieve where state is locked into network functions, such as with many middlebox functions. For example, firewalls often rely on maintaining connection information states, network address translators often rely on maintaining address mapping states, load balancers often rely on maintaining server selection mapping states, etc. Such state reliance can frustrate the ability of virtualized versions of those functions to launch new instances of the functions and to reassign traffic to those instances, which can limit the elasticity, resilience, and other benefits sought from virtualization.

A number of approaches have been attempted to support state reliance. Some approaches have focused on addressing elasticity by attempting to modify network function software to enable state migration. For example, some have developed application program interfaces (APIs), or the like, so that some state information can be removed from one instance and added to another instance, as needed. However, such state migration-based approaches are limited at least because they typically cannot address the problem of unplanned failures, and they typically cannot avoid reliance on affinity of flow to instance. Other approaches have focused on addressing failure conditions, for example, either by checkpointing the network function state regularly such that, upon failure, the network function can be reconstructed; or by logging all inputs (e.g., packets) and using deterministic replay to rebuild the state upon failure. In the case of checkpointing, there tends to be substantial latency added to each packet (e.g., on the order of 10 ms). In the case of deterministic replay, per-packet latency tends to be minimized (e.g., to hundreds of microseconds), but the cost of fail-over is typically very high (e.g., as all packets received since the last check point must be replayed). Further, these and other failure-focused approaches do not tend to address elasticity.

In general, conventional approaches to virtualizing network functions, including the approaches described above, have centered on making minimal changes to network function architecture. A motivation for such thinking is that the conventional network function architecture is highly effective at providing certain performance characteristics even at high data rates. For example, state-reliant middleboxes typically must look up current state information to process each packet coming into the network function, so that effective processing at high data rates can depend on very high-speed lookups of the state data. Further, conventional data stores have been too slow (e.g., too high-latency and/or too low-throughput) to support distributing or off-loading of the state data lookups and/or other portions of the network functions. For example, at a 10 Gigabit-per-second data rate, the middlebox may have to perform millions of state data lookups, and each lookup may involve allocating and accessing memory, copying the state data to a network function instance, and/or other processes, all of which add latency to each lookup. For these and other reasons, new architectures for virtualizing network functions are difficult to conceive and implement, and are not typically attempted.

Embodiments described herein include novel architectures for virtualized state-reliant network functions that break the conventionally tight coupling between the state data that network functions need to maintain and the processing that network functions need to perform (referred to herein as "StatelessNF"). Embodiments support high network elasticity, while being highly resilient to failure. Generally, embodiments implement stateless virtualized middlebox systems to perform network function processing and to interface with a remote state data store. As described above, a number of technological challenges frustrate distributing or off-loading middlebox functionality in a manner that is elastic and resilient even at high data rates. Various techniques are described herein for addressing these and other technological challenges to achieve desired performance levels in virtualized network middleboxes. As used herein, the term "middleboxes" generally refers to any state-reliant network function or process, such as firewalls, network address translators, load balancers, routers, etc. Further, as used herein, references to a "remote" or "separate" data store can generally include any implementation where the state storage and pipeline processing are decoupled. For example, the state data store can be logically decoupled from the processing pipeline (e.g., running on a different virtual machine even though it is implemented on a same physical computational device. Further, references herein to a "virtual machine" can include any virtual implementation of a computational environment (e.g., including lightweight implementations, such as containers).

For example, some implementations include an efficient packet processing pipeline that leverages high-performance input/output (I/O) and can be packaged as a docker container for easy deployment. Some implementations further include an optimized data store client interface (e.g., leveraging advanced low-latency data stores) that can reduce and ultimately mask added latency arising from remote state lookups. Some implementations further include novel orchestration techniques to monitor the health of instances and to launch and kill instances, as needed (e.g., based on policy). As described above, the novel StatelessNF approaches described herein can offer improved failure resilience and elasticity, as well as other features, such as: some StatelessNF embodiments do not rely on affinity to ensure proper network operation, but instead permit any packet to go to any instance; some StatelessNF embodiments can enable a zero (or near zero) failover cost, where traffic can be rerouted upon failure to a new instance without any penalty (such as causing existing flows to fail, taking time to recover the state, etc.); and the zero (or near zero) failover cost and other aspects can permit speculatively failover, as opposed to conventionally conservative failover response e.g., only when failure is nearly certain), which can appreciably reduce failure detection time.

Network functions virtualization (NFV), where network processing can occur within virtualized environments rather than special-purpose appliances, is poised to serve as a central building block in future networks. Simply running virtual versions of the physical appliance counter parts, as is the case today, only tends to provide operational cost efficiencies, but typically falls short in supporting the vision of a dynamic network infrastructure that elastically scales and is resilient to failure. As described herein, many limitations of conventional NFV approaches can be linked to a traditionally tight coupling of state and processing, even within otherwise flexible virtualized network functions.

Figure 1:
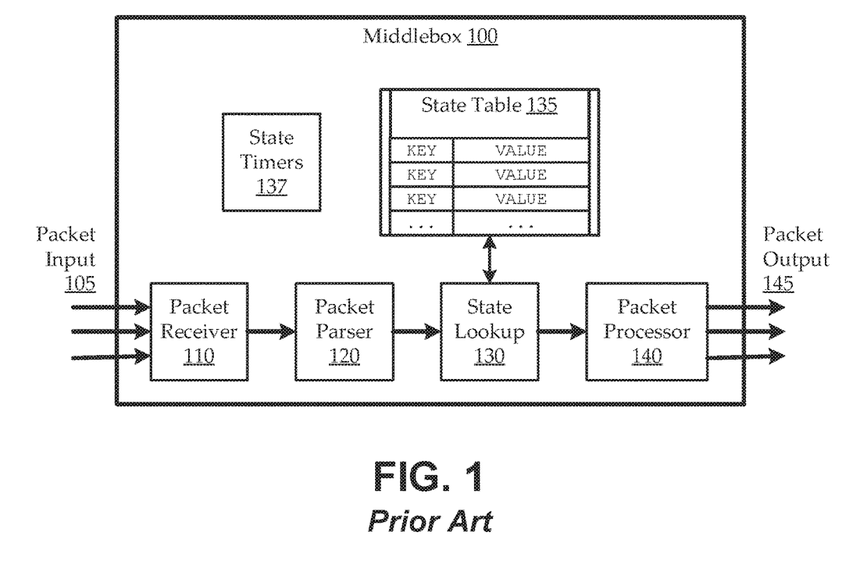
FIG. 1 shows a block diagram of a conventional middlebox.

Although they can be designed to serve many purposes in a network, middleboxes typically share a common design. FIG. 1 shows a block diagram of a conventional middlebox 100. The middlebox 100 has a packet processing pipeline that can include a packet receiver 110, a packet parser 120, a state lookup 130, and a packet processor 140. The packet receiver 110 receives packets from one or more packet inputs 105. For each received packet, the packet parser 120 can parse the packet to decode its contents (e.g., the 5-tuple of internet protocol (IP) source and destination, the transport type, the transport source and destination, etc.). The state lookup 130 can use the decoded contents as a key to lookup state information in a local state table 135 for the middlebox 100. The state table 135 result can dictates the processing that should occur according to a state associated with the packet contents, such as connection establishment information (e.g., for a firewall), address mappings and the pool of available ports and IP addresses (e.g., for a NAT), a mapping of flow to a back-end server (e.g., for a load balancer), etc. The packet processor 140 can then process the packet according to the lookup result and can output the processed packet via one or more packet outputs 145. The packet processing can be based on certain timing information that can be maintained by one or more local state timers 137 of the middlebox 100.

In some cases, a packet processing failure can occur. As used herein, a "failure" refers generally to a fail-stop failure (e.g., as opposed to byzantine failures). Such a failure can be due to the hardware itself failing, to some form of network error which makes the network function unreachable, etc. Recent studies have confirmed that, in conventional middleboxes 100, such failures occur regularly and are highly disruptive. Such disruptions can arise from various factors, including multiple factors relating to the conventionally tight coupling of processing and state. Some illustrations of such factors and their related failures are shown in FIGS. 2A-2D.

Figure 2A:
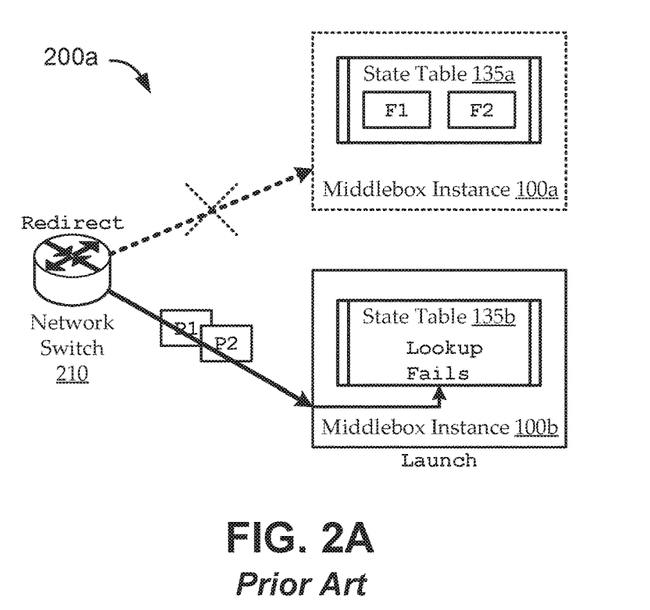
FIG. 2A shows a first illustrative failure condition for an illustrative conventional virtualized middlebox.

FIG. 2A shows a first illustrative failure condition 200a for an illustrative conventional virtualized middlebox 100 (e.g., configured as a NAT). Each virtualized instance of the middlebox 100 can be an implementation of the middlebox 100 of FIG. 1, or the like. As illustrated, the middlebox 100 includes a local state table 135 that stores the mapping for two flows ("F1" and "F2"). Upon failure of a first middlebox instance 100a, it is desirable to quickly launch a new instance (middlebox instance 100b), to redirect traffic to the new middlebox instance 100b. For example, software-defined networking (SDN) or other techniques can be used to instruct a network switch 210 to redirect the traffic, as desired. Packets e.g., "P1" and "P2") within flows F1 and/or F2 are redirected to the new middlebox instance 100b, but the state table 135b of middlebox instance 100b does not include the mappings for F1 and F2. A state lookup by the packet processing pipeline will result in a failed lookup. In such a case, the second middlebox instance 100b will then create new mappings, which will ultimately not match what the server expects. This can cause some or all connections eventually to timeout, such that the connections will need to be re-established. Some enterprises employ so-called "hot-standby redundancy" to address such failures, but this can add appreciable expense (having extra devices that are typically unused), and can still leave the middleboxes 100 vulnerable to other failure factors.

For example, another failure factor can be a result of the high cost of failover. As described above, conventional approaches tend to be very be conservative when determining whether a device has failed because of high failover costs. For example, failure of a device to respond to one message could suggest that the device is down, that the network dropped a packet, that the device is highly loaded and is taking longer than expected to respond, etc. Being too aggressive with failover response e.g., launching a new instance and redirecting traffic) can result in unnecessary failovers, which can cause downtime or can even potentially cause a backup to become a master while the original is still alive (but considered dead), leading to problems. On the other hand, being too conservative can cause traffic to continue to be processed by a failing device, which can lead to disruption.

Various approaches to failure resilience have been proposed. One proposed approach has been "pico replication," which is a high-availability framework that frequently checkpoints the state in a network function, so that, upon failure, a new instance can be launched with the state intact. To guarantee consistency, packets are only released once the state that they impacted has been checkpointed. This reliance on checkpointing can lead to substantial per-packet latencies e.g., 10 ms for a system that checkpoints 1000 times per second, under optimal conditions). Another proposed approach seeks to reduce such latency by logging all inputs (packets) coupled with a deterministic replay mechanism for failure recovery. In such an approach, per-packet latency can be minimized (e.g., the time to log a single packet), but the recovery time can be high (e.g., on the order of the time since a last checkpoint). Both approaches can bring appreciable performance penalties, and neither addresses scalability or asymmetric routing problems, which are described below.

Scalability is a significant factor driving virtualization of network functions. For example, utilization of middleboxes is typically on the order of 5-20% in enterprises, and, even so, they still often get overloaded. Virtualization theoretically provides elasticity to scale in and out to meet changes in demand, without requiring expensive deployment and maintenance of large numbers of normally unused physical appliances. As with the failover case, tight coupling of state and processing can cause problems with scalability, even when the state is highly partitionable (e.g., only used for a single flow of traffic, such as connection tracking in a firewall). Further, shared state (e.g., what ports are available to use in a NAT) can still rely on synchronizing the state across all instances of a middlebox.

Figure 2B:
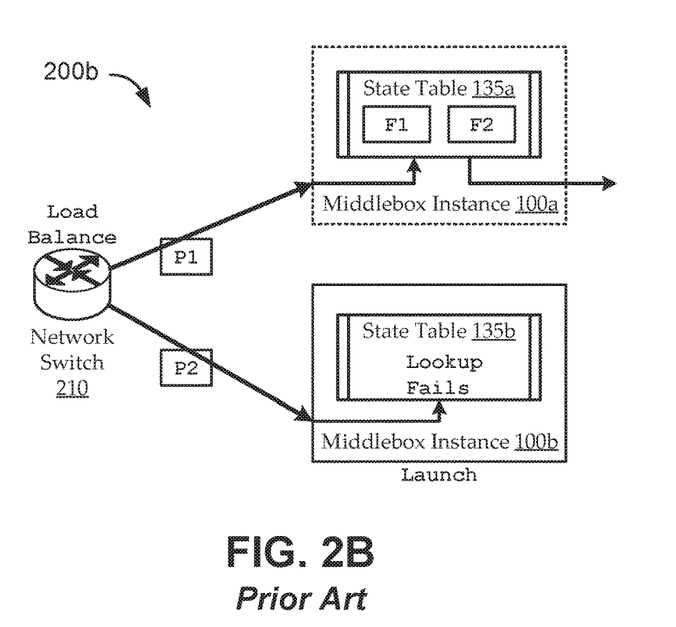
FIG. 2B shows a second illustrative failure condition for an illustrative conventional virtualized middlebox, such as the one in FIG. 2A.

FIG. 2B shows a second illustrative failure condition 200b for an illustrative conventional virtualized middlebox 100, such as the one in FIG. 2A. As illustrated, for the purpose of load balancing (e.g., scaling), a second middlebox instance 100b is launched to handle packets associated with flow F2 (packets associated with flow F1 are labeled "P1," and packets associated with flow F2 are labeled "P2"). As described above, the state table 135b of the second middlebox instance 100b does not have the states stored for either of flows F1 or F2. Even though a new middlebox instance 100b is launched to handle the overloaded condition of middlebox instance 100a, no existing flows can be moved to the new middlebox instance 100b because of the lack of state information (even in the case of a partitionable state). For example, if the middlebox 100 is a NAT device, packets from flow F2 directed at the new instance will result in a failed lookup (e.g., with the condition described in FIG.

2A), which can cause the connection to timeout (or require the application to detect, if using UDP).

Figure 2C:
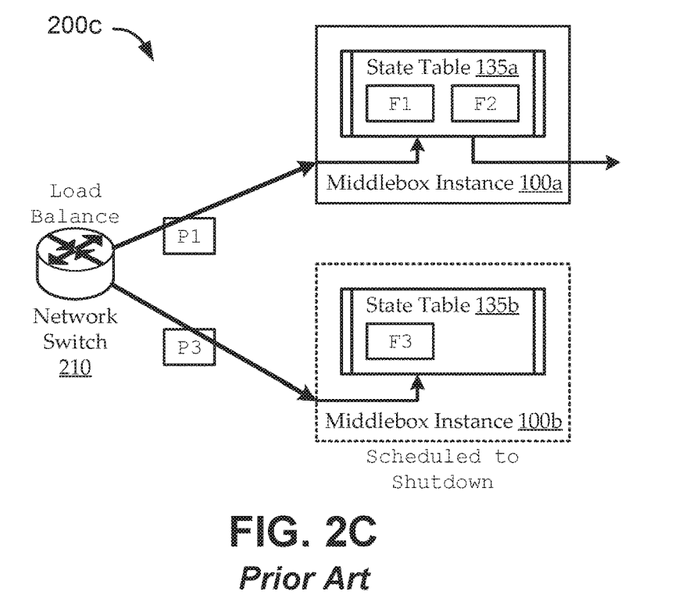
FIG. 2C shows a third illustrative failure condition for an illustrative conventional virtualized middlebox.

FIG. 2C shows a third illustrative failure condition 200c for an illustrative conventional virtualized middlebox 100, such as those of FIG. 2A or 2B. FIG. 2B illustrates a scaling out condition (increasing instances to meet increasing demand), and FIG. 2C illustrates a scaling in condition decreasing instances to meet decreasing demand). For example, after launching multiples middlebox instances 100, the load decreases, and it is desired to shut down (kill) an instance currently handling flow F3. State information for flow F3 is stored in state table 135b of middlebox instance 100b, but not in state table 135a of middlebox instance 100a. Accordingly, conventional approaches must wait until middlebox instance 100b is completely drained (all of the flows it is handling are complete) before shutting down that middlebox instance 100b. Though such an approach can be effective, the coupled state tends to limit agility, tends to rely on special handling by an orchestration function, and tends to depend highly on flows being short-lived flows (e.g., to drain quickly). One conventional approach to addressing such scaling limitations is to instrument the network functions with code that can export state from one instance and import that state into another instance (e.g., where state can be partitioned and migrated). However, such approaches have not typically addressed failures and have relied on affinity of traffic to respective instances to work properly.

Figure 2D:
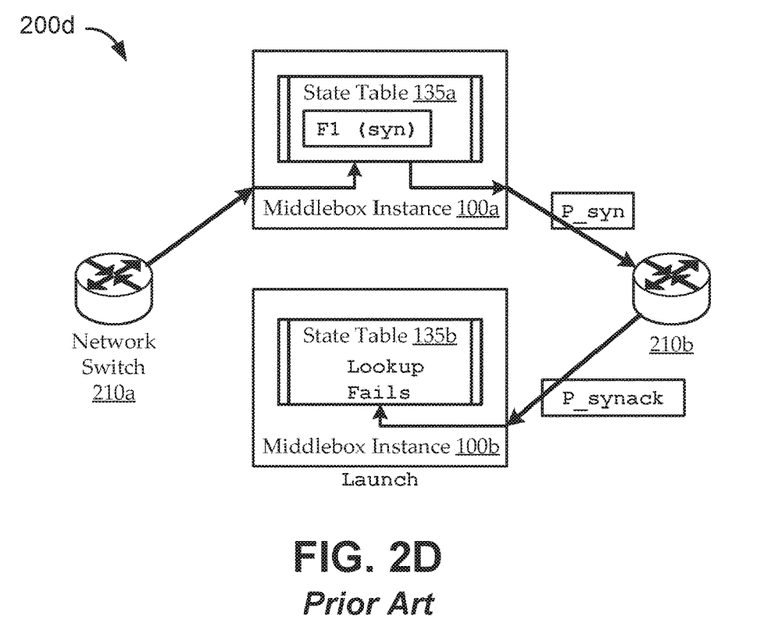
FIG. 2D shows a fourth illustrative failure condition for an illustrative conventional virtualized middlebox.

FIG. 2D shows a fourth illustrative failure condition 200d for an illustrative conventional virtualized middlebox 100 (e.g., a virtualized firewall middlebox). The fourth condition 200d can arise in context of asymmetric and multi-path routing. Asymmetric routing relates to the fact that forwarding of traffic from a client to a server may traverse a different path than the traffic from a server to a client. Conventional approaches rely on traffic in both directions going through the same middlebox instance 100 to ensure proper state handling. For example, as illustrated, a first middlebox instance 100a of a firewall has established and stored state from an internal client connecting to a server (e.g., a SYN packet). A return syn-ack packet from the server is directed by a network switch 210b to a different middlebox instance 100b of the firewall, which results in a failed lookup and the packet being dropped. Similarly, multi-path routing can relate to recent pushes (e.g., with multi-path TCP) to be able to split a flow to capitalize on the availability of path diversity (e.g., in Wi-Fi and LTE networks). The split-flow traffic can still go through a single provider's network function infrastructure (e.g., either at the client side or the server side), and, as such, may rely on the traffic going through a single middlebox instance 100. Some conventional approaches have proposed algorithms for intrusion detection that can work across instances, but such approaches are not typically generalizable to other cases Some other conventional approaches have attempted to exploit Hot Standby Router Protocol (HSRP), or the like, to synchronize state across middleboxes, but such approaches do not typically scale sufficiently.

Figure 3:
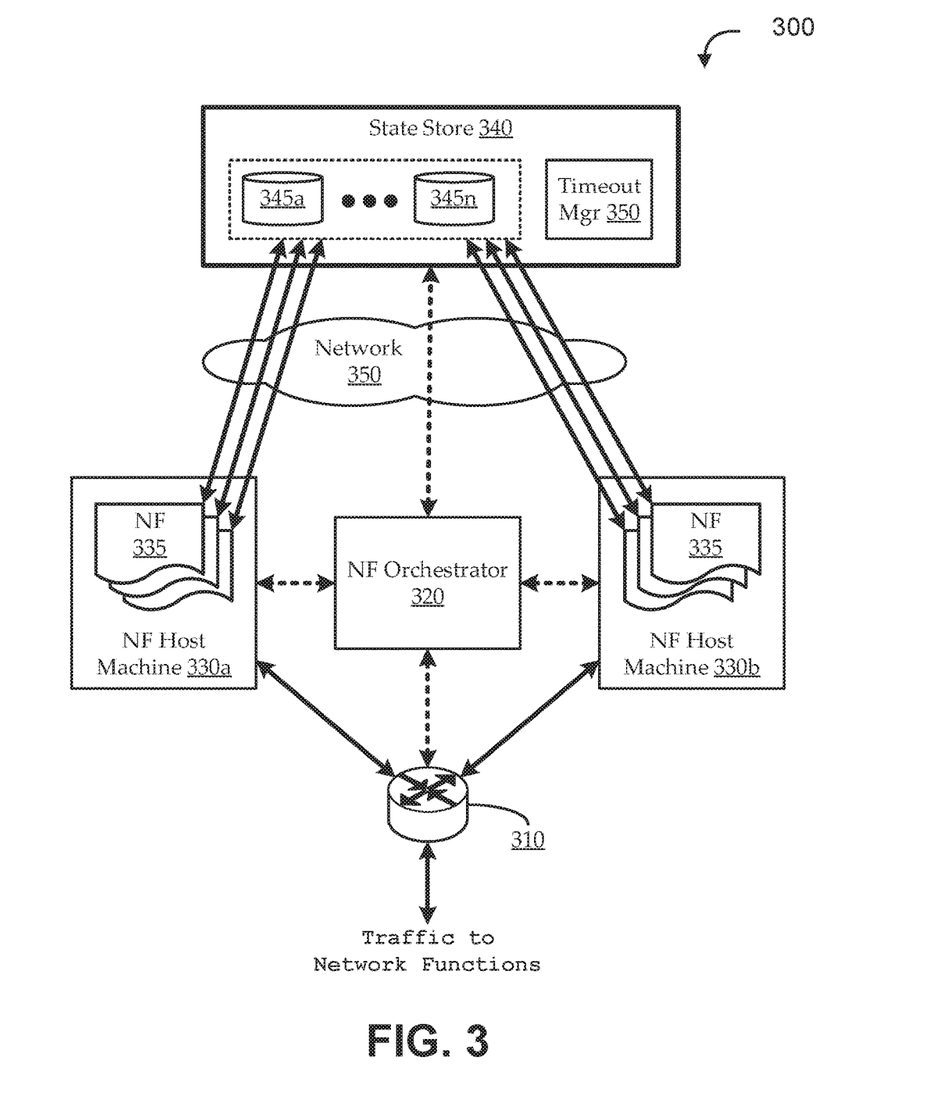
FIG. 3 shows a simplified diagram of a novel StatelessNF environment, according to various embodiments.

FIG. 3 shows a simplified diagram of a novel StatelessNF environment 300, according to various embodiments. The illustrated StatelessNF environment 300 can include a multiple virtualized stateless network functions 335 in communication with a separate state data store 340. In some embodiments, the virtualized stateless network functions 335 are disposed on one or more network function host machines 330 in communication with the state data store 340 via a network 350, such as the Internet or any other suitable network. As described herein, such an environment can enable the network functions to become stateless, and the statefulness of the applications (e.g., a stateful firewall) can be maintained by storing the state in the separate state data store 340. Some implementations of the state data store 340 can further include a timeout manager 350. One or more network switches 310, or the like, can direct traffic (e.g., packets) between the data network (e.g., which may or may not be the same network 350, such as the Internet) and the various virtualized stateless network functions 335. Embodiments of the StatelessNF environment 300 further include a network function orchestrator 320 that can direct operation of other components of the StatelessNF environment 300 (e.g., spawn new instances, kill existing instances, etc.).

The StatelessNF environment 300 can provide various features. One such feature is that Embodiments of the StatelessNF environment 300 can spawn a new instance upon failure, as the new instance will have access to all of the state needed. The spawned instance can immediately begin handling traffic without disruption to the network. Another such feature is that, because there is little to no penalty with failing over, embodiments of the StatelessNF environment 300 can failover much more aggressively and quickly. For example, implementations do not have to be certain a network function has failed; rather, failover can be performed upon speculating that the function has failed, and if it is later determined that no failure occurred, the failover can be corrected (e.g., by scaling in, etc.). Another such feature is that, when scaling out, embodiments of the StatelessNF environment 300 can immediately launch a new network function instance to which traffic can be immediately redirected. For example, the network function instance can have access to any needed state information by its access to the state data store 340 without relying on migration or state data, etc. Another such feature is that embodiments of the StatelessNF environment 300 can scale in simply by redirecting traffic away from the instance to be shut down, then shutting down the instance. For example, there may be no need to wait for draining flows, etc. Another such feature is that, in embodiments of StatelessNF environment 300, each instance can share all state, so correct operation is not reliant on affinity of traffic to instance. Implementations can be configured to assume that any individual packet can be handled by any instance, resulting in an abstraction of a scalable, resilient network function. For example, packets can be properly handled even if they traverse different paths, as the state information is accessible to all instances.

Notably, decoupling the state information from the network functions is rife with difficulty, including various challenges relating to achieving desired performance levels with such an architecture. Though conventional approaches include many different techniques seeking to address limitations of conventional NFV, performance challenges have tended to frustrate and deter attempts to decoupling state. For example, many typical network function middleboxes handle millions of packets per second because they tend in many cases to be in a critical path of network processing. As described with reference to FIG. 1, the packet processing pipeline of a conventional middlebox typically looks up state in its local state data store for each packet passing through the pipeline; so that there may be millions of lookups per second. Practical limitations of conventional data stores, network interfaces, processing pipelines, etc. have tended to make performing such high volumes of lookups at such high speeds impractical.

Accordingly, embodiments of StatelessNF include various novel approaches to the state data store 340, the network function orchestrator 320, the virtualized stateless network functions 335, etc. Turning first to the state data store 340, embodiments are designed to stores the state of many stateful network function applications in communication therewith, while allowing the processing instances to remain stateless. In separating the state and processing, each part can concentrate on its own functionality. In the case of the state data store 340, for a resilient network function infrastructure, the state data store 340 is designed to reliably store the data with high availability. Some implementations enable such reliability and availability replication. For an in-memory data store, such as RAMCloud, the cost of replication would be high (e.g., because it would use a lot of RAM). Accordingly, some implementations use RAMCloud to store a single copy of each object in DRAM, with redundant copies on secondary storage, such as disk (on replica machines). To overcome performance costs of full replication, RAMCloud can use a log approach where write requests are logged, and the log entry is what is sent to replicas, where the replicas fill an in-memory buffer, and then store on disk, or the like. To recover from a RAMCloud server crash, memory contents can be reconstructed by replaying the log file.

Implementations of the state data store 340 are further designed to have low-latency access. While any sufficiently low-latency data store can be used, some implementations use RAMCloud, which was designed for low-latency access. For example, RAMCloud can be based entirely in DRAM and can provide low-latency access (e.g., 6 ms reads, 15 ms durable writes for 100 bytes of data) at large-scale (e.g., 10,000 servers). This can be achieved both by leveraging low-latency networks (e.g., Infiniband and RDMA), by being entirely in memory, and through optimized request handling.

Implementations of the state data store 340 are further designed to extend beyond key-value storage. In a typical key-value interface, clients can read values by providing a key (which returns the value), or write values by providing both the key and value. Embodiments leverage such a key-value interface for much of the state in network functions. However, one challenge for StatelessNF is that timers represent a common type of state in network functions, and timers do not effectively conform to a key-value interface. For example, implementing timers conventionally with a key-value interface would involve continuously polling the data store, which would be highly inefficient. Some embodiments extend the data store interface to allow for the creation and update of timers (illustrated as timeout manager 350). For example, a tinier alert notifies one, and only one, network function instance, for which the handler on that instance processes the timer expiration event.

Embodiments of the network function orchestrator 320 can monitor the network function instances for load and failure, and adjusting accordingly. Such can involve various functions, such as monitoring and instance management capability, and implementation of a programmable network to enable fine grained control over the network. Embodiments can enable monitoring and instance management capability by maintaining abstraction of a single, reliable, network function which can handle infinite load, while ("under the hood") maintaining a highly efficient infrastructure. This can involve monitoring resource usage and detecting failures, and adjusting accordingly (e.g., by launching and/or killing instances).

Embodiments of the network function orchestrator 320 can further leverage various monitoring approaches to monitor the health of network functions to detect failure and traffic and resource overload conditions. In some embodiments, the monitoring functions are deployed in, or are assisted by functions of, the network function host machines 330. Some such monitoring approaches can include Docker monitoring, VMW are vcenter health status monitoring, IBM Systems Director for server and storage monitoring, etc. Some implementations use docker containers to deploy the virtualized stateless network functions 335. Such implementations can include an interface that interacts with the Docker engines remotely to monitor, launch, and destroy the container-based network functions. Sonic implementations can monitor (e.g., through secure shell (SSH) calls, or the like) the network function resources (e.g., cores, memory, and SR-IOV cards) to make sure they have enough capacity to launch and host network functions.

As described above, embodiments of the network function orchestrator 320 can manage traffic by redirecting to, and/or away from, network function instances. For example, when a new instance of a network function is launched, traffic should be directed to the instance; when failure occurs, or the network function orchestrator 320 is scaling-in, traffic should be redirected to a different instance. Some implementations enable such traffic direction using SDN controllers, and the like, such as OpenFlow, P4, ONOS, Floodlight, OpenDaylight, etc.

Figure 4:
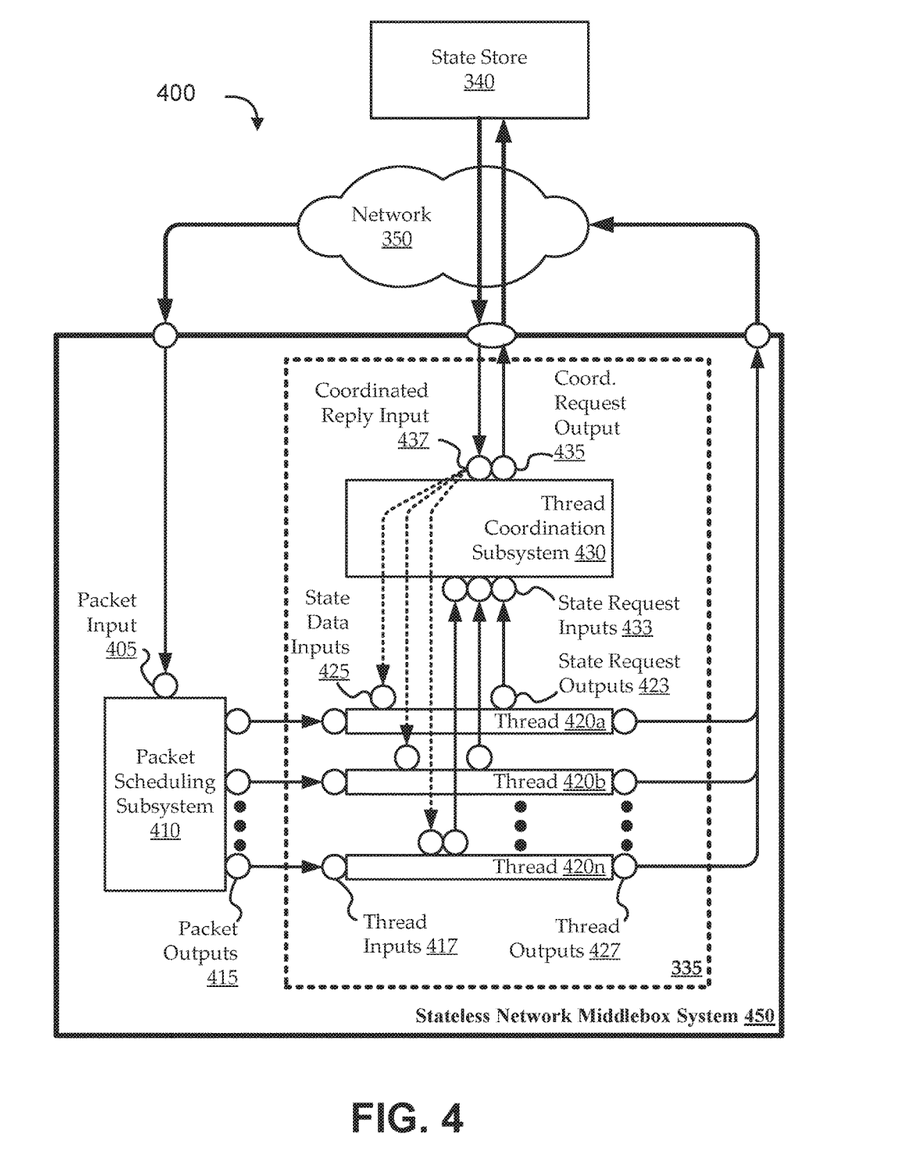
FIG. 4 shows an illustrative partial StatelessNF environment, according to various embodiments.

Some novel aspects of embodiments of the virtualized stateless network functions 335 are described with reference to FIGS. 4 and 5. Some embodiments include novel approaches to some or all of a packet processing pipeline that can be deployed on demand, high-performance network I/O, and an efficient interface to the state data store 340. FIG. 4 shows an illustrative partial StatelessNF environment 400, according to various embodiments. The environment 400 includes stateless network middlebox systems 450 (only a single one is shown for clarity) in communication (e.g., via a network 350) with a separate (e.g., remote) state data store 340. The stateless network middlebox system 450 includes a virtualized stateless network function 335, having a thread coordination subsystem 430 and multiple parallel threads 420.

Embodiments of the thread coordination subsystem 430 include multiple state request inputs 433, a coordinated request output 435, and a coordinated reply input 437. Each parallel thread 420 is associated with (i.e., is a processing pipeline for) the virtualized stateless network functions 335, which is a state-reliant network function. Each parallel thread 420 includes a thread input 417 (i.e., to receive packets), a state request output 423 responsive to the thread input 417 (e.g., to request state information keyed according to contents parsed from the packets and coupled with a respective one of the state request inputs 433 (of the thread coordination subsystem 430), a state data input 425 responsive to the coordinated reply input 437, and a thread output 427 responsive to application of the thread input and the state response input to the associated state-reliant network function (e.g., to output packets processed according to the retrieved state data). The coordinated reply input 437 is responsive to state data received from the remote state data store 340 in response to the coordinated request output 435, and the coordinated request output 435 is generated as a coordinated batching of the state request inputs 433.

For example, the thread coordination subsystem 430 can include a request batcher having the coordinated request output 435 and the state request inputs 433, and a buffer pool coupled with the request batcher and having pre-allocated memory to store state requests received via the state request inputs 433 for coordinated batching. Multiple requests from multiple threads 420 can be buffered, analyzed, and batched so that the number of batched state requests sent to the state data store 340 is appreciably less than the number of state requests sent from the threads 420 to the thread coordination subsystem 430. Such an approach can effectively spread (amortize) latency of the remote state data store 340 requests across multiple thread 420 requests. In some implementations, the thread coordination subsystem 430 includes multiple state data memory locations responsive to the coordinated reply input 437 (e.g., to temporarily buffer the state data returned from the remote state data store 340), and the state data input 425 includes a pointer to an associated one of the state data memory locations.

In some embodiments, each parallel thread 420 has multiple sub-threads, including a first sub-thread having the thread input 417 and a packet queue coupled with the thread input 417; and a second sub-thread coupled with the packet queue and having the state request output 423, the state data input 425, and the thread output 427. For example, the first sub-thread can receive, parse, and hold packets in the packet queue; while the second sub-thread manages processing of the packets, including requesting and receiving state data for the queued packets (e.g., in a first-in first-out (FIFO) order, or the like). The multiple parallel threads 420 can be processed by multiple cores of a multi-core processing system, by parallel pipelines of a virtual machine, and/or in any other suitable manner.

Some embodiments of the stateless network middlebox system 450 further includes a packet scheduling subsystem 410 to help schedule packets across the various parallel threads 7420. For example, the packet scheduling subsystem 410 can include a packet input 405 and multiple packet outputs 415, each coupled with a respective one of the thread inputs 417. In some implementations, the packet input 405 of the packet scheduling subsystem 410 is communicatively coupled with a data network (e.g., a network switch of the Internet, etc.), the thread output 427 of each thread 420 is communicatively coupled with the data network (e.g., the same or a different network switch, or the like).

Figure 5:
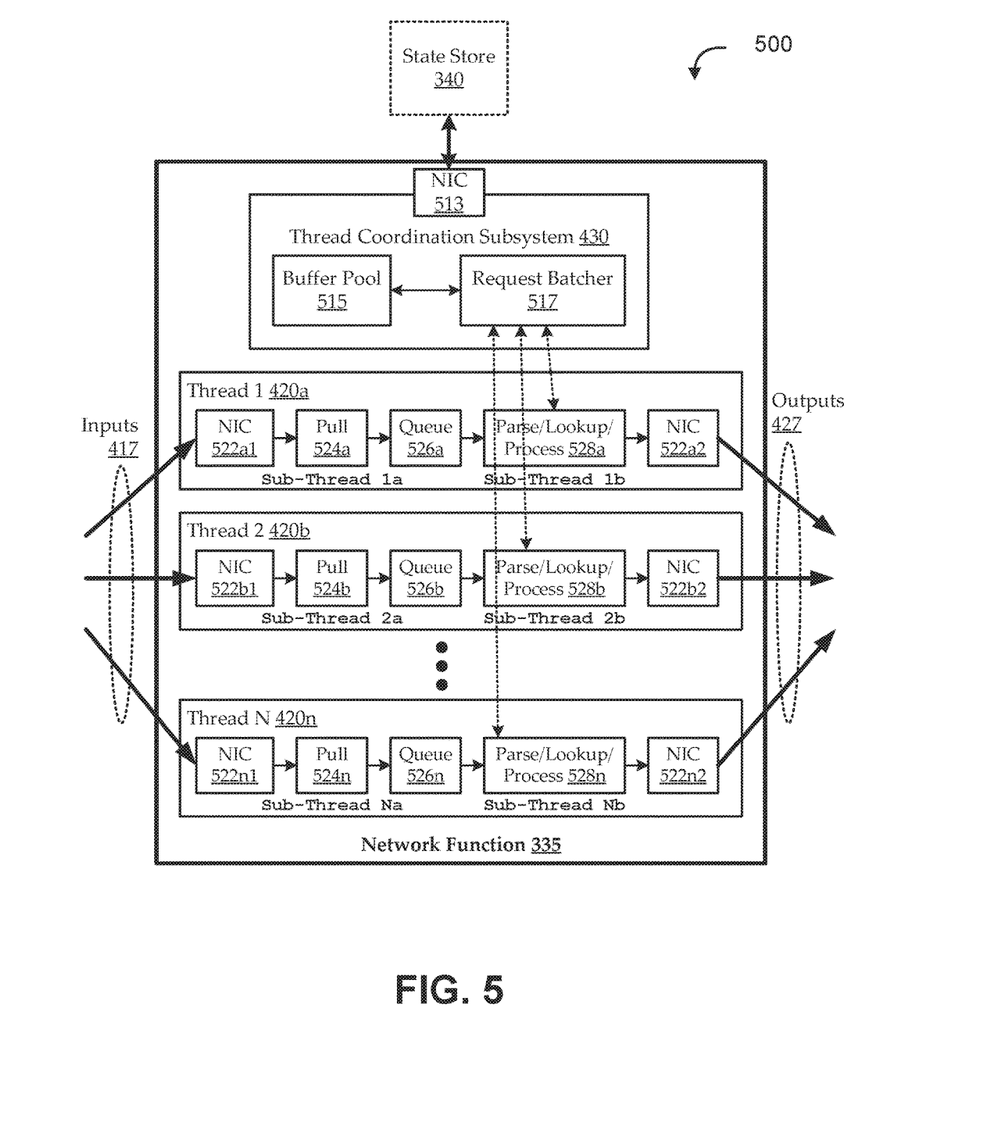
FIG. 5 shows another illustrative partial StatelessNF environment, according to various embodiments.

FIG. 5 shows another illustrative partial StatelessNF environment 500, according to various embodiments. The environment 500 can be an implementation of the environment 400 described with reference to FIG. 4, or vice versa. As described above, embodiments of the virtualized stateless network functions 335 can include a number of novel features, such as a novel deployable packet processing pipeline, a novel high-performance network I/O, and/or a novel optimized data store client interface.

To increase the performance and deployability of virtualized stateless network functions 335, each network function can be structured with a number of packet processing pipes (parallel threads 420). The number of threads 420 can be adaptive based on traffic load, which can enable a network function with a better resource utilization. Each thread 420 can include multiple e.g., two sub-threads), and a queue 526 (e.g., a single, lockless queue). The first sub-thread of a given thread 420*n* can be responsible for polling a network interface (NIC 522*n*1) for packets, pulling the packets (pull 524*n*), and storing them in the respective queue 526*n*. The second sub-thread of a given thread 420*n* can perform the main processing (shown as "parse/lookup/process" 528*n*) by dequeuing the packet, performing an lookup by calling the remote state interface to read, applying packet processing based on returned state and network function logic, updating state in the data store, and outputting the resulting packet(s) (if any) (via network interface 522*n*2 to thread outputs 427).

While network function instances can be deployed and hosted with a variety of approaches (e.g., virtual machines, containers, physical devices, etc.), some embodiments described herein use containers to implement the virtualized stateless network functions 335 as deployable units. For example, containers can provide fast deployment, low performance overhead, and high reusability. In some implementations, each virtualized stateless network function 335 is implemented as a single process docker instance with independent cores and memory space/region. Such an implementation can ensure that network functions do not affect each other. As described with reference to FIG. 4, some embodiments include a scheduler that can effectively share the physical interface to the network among the containers (threads 420). Some implementations of the scheduler can use are in compliance with) a single root input/output virtualization interface (SR-IOV), which can provide virtual interfaces to each network function instance. Some modem network cards have hardware support for classifying traffic and presenting to the system as multiple virtual devices, and each of the virtual devices can be assigned to a network function instance. For example, one implementation uses Intel x520 server adapters that can provide up to 126 virtual cards, each capable of reaching maximum traffic rate (individually). In the implementation, for connectivity to the state data store 340, function hosts are equipped with a single Infiniband card that is built on the Mellanox RDMA library package, which allows the Infiniband NIC to be accessed directly from multiple network function user-space applications (bypassing the kernel). Other implementations can use other technologies, As described above, it is desirable for embodiments to provide high performance I/O to meet expected packet processing rates. To this end, some embodiments use so-called "zero copy" techniques. Some implementations of virtualized stateless network functions 335 can be structured on top of a Data Plane Development Kit (DPDK) architecture, which can provide a simple, complete framework for fast packet processing in data plane applications. One challenge that arises with the use of DPDK in the context of containers is that the large memory pool allocation used for packet buffers can rely on huge page support, and that multiple packet processing threads 420 may run simultaneously on a single server. In some implementations, each thread 420 is assigned a unique huge page filename and specified socket memory amount to ensure isolation. For example, DPDK Environment Abstraction Layer (EAL) interface can be used for system memory allocation/de-allocation and core affinity/assignment procedures among the virtualized stateless network functions 335.

As described above, some embodiments include a novel client interface to the state data store 340 through which lookups in packet processing occur. Typically, each state data store 340 is implemented with an application programming interface (API) to read and write data. For RAMCloud, for example, the API includes a key-value interface that performs requests via an RPC interface and that leverages Infiniband (and some RAMCloud implementations can include a client interface that abstracts away the Infiniband interfacing). To optimize such an interface to match the common structure of network processing, embodiments use various techniques. One such technique is based on a characteristic of certain advanced data stores (e.g., RAM-Cloud) that a single read/write has low latency, but each request has overhead. When packets are arriving at a high rate, implementations can aggregate multiple requests into a single request. For example, in RAMCloud, a single read can take 6 ms, whereas a multi-read of 100 objects may only take 51 ms (or, effectively 0.51 ms per request). As described above, this can be accomplished by a request batcher 517 in the thread coordination subsystem 430. If the batch size is too small, opportunities for efficiency gains may be lost; if the batch size is too large, it can take too much time to batch the requests (even with a timeout), and higher latency may be induced by waiting for packets. Some embodiments include a fixed batch size determined to optimize the balance between efficiency and latency. Other embodiments include an adaptive batch size that can dynamically increase or decrease the batch size based, for example, on current traffic rates.

As described above, some embodiments of the thread coordination subsystem 430 include a pre-allocated buffer pool 515. Submitting requests to the state data store 340 typically involves the client allocating memory for the request (e.g., creating a new RPC request). The memory allocation can take time and can add latency, accordingly. Using a preallocated buffer pool 515 can reduce the overhead associated with allocating memory. Further, when a thread 420 requests state data from the remote state data store 340 (via the thread coordination subsystem 430), it is important for the requesting thread 420 to be able to access the retrieved state data for use in processing the packet(s) associated with the state request. In some implementations, such data is copied to a thread 420. In other implementations, as described above, a pointer is provided between the buffer and the thread 420 which issued the state request. By providing a pointer to the location of the retrieved state data, the requesting thread 420 can access the data without a local copy.

While embodiments are described above with reference to a single virtualized stateless network function 335 for clarity, actual deployments of the StatelessNF approaches described herein typically involve many instances of a network function, many different network functions possibly accessing the same data, and/or other concurrencies. Concurrency challenges are often due to dependencies between parallel execution units. Some cases involve dependencies within a single network function instance. To achieve high performance, interactions between a virtualized stateless network function 335 and the state data store 340 involve asynchronous requests. That is, rather than blocking on reads/writes, the read/write request is transmitted, and execution is then returned to process something else while waiting for a response (e.g., processing the next packet (packet Y) while waiting for data needed to process packet X). If the execution then requests the same data (e.g., packet X and Y belong to the same flow, and both increment a counter), a naive solution to submit requests and then process with the returned data will lead to incorrect data (e.g., a read after write dependency). Some other cases of concurrency involve dependencies between multiple network function instances. For example, the same Packet X and Packet Y from above could be processed by separate network function instances. All dependencies do not need to be related to packets within the same flow, as there can be common data structures accessed independent of the flow, or the network function may not process flows (e.g., router network functions would process route announcement messages). Some embodiments modify the virtualized stateless network functions 335 to deal with internal dependencies, modify the network management architecture to optimize processing, and/or modify the state data store 340 to provide support for scaling to large numbers of instances.

Some implementations maintain a table of outstanding state requests to address dependencies from within a single network function instance. For example, when a new request is to be issued, a memory optimizer can first check the outstanding request table to see if the data being read or written is part of an outstanding request. The action taken if the data is part of an outstanding request can depend on what the requests are. An illustrative set of actions is provided in the following table:

| Outstanding Request | New Request | Action |
| --- | --- | --- |
| Read | Read | Do not submit a new read, but add the current execution context to be notified. |
| Read | Write | Set the read value to what is to be written and proceed as if read request returned, when read request does return, ignore it. |
| Write | Read | Do not submit a new read, but instead return immediately with the value to be written. |
| Write | Write | Submit the new write. |

Some embodiments operate under an assumption that dealing with dependencies within a single network function instance can be simpler and more efficient than deadline with dependencies across instances. Accordingly, such embodiments can provide functionality at the network level to attempt to maximize the dependencies within and minimize the dependencies between instances. Further, to effectively support stateless network functions, some embodiments include server-side (e.g., state data store 340) functionality. However, adding such functionality to the state data store 340 can involve balancing providing additional functionality against pushing too much processing (and therefore reducing performance) on the data store, or bloating the data store beyond a general and simple interface. Some implementations add counter functionality to the state data store 340 (counters appear in almost every network function). For example, implementations can submit an increment request to the state data store 340, and the returned value is the incremented value. The requesting network function instance can use that counter value, and other instances can be concurrently incrementing that counter. Other implementations add timer functionality to the state data store 340 (e.g., timers are used in network functions for determining when to remove an entry from a table, to retransmit a packet/message, to perform some periodic task, etc.). In a stateful network function model, timers are internal to a network function instance, and each instance maintains its own timer. In such a StatelessNF implementation, a timer can relate to the network function as a whole (not just to a particular instance). For example, a NAT can include an address translation mapping for a given flow in its table, which can be removed if there is no packet for some time period. While some implementations can store timer values in the state data store 340 (e.g., an instance can periodically check whether the tinier expired), such an approach can be inefficient and can involve coordination among the instances. Instead, providing the timer functionality at the server side can enable a network function instance to set a new timer (e.g., whatever instance created the entry for the NAT address mapping for a given flow), reset the timer (e.g. whenever an instance receives a packet for a given flow), and get a notification for when the timer expires (only a single instance will process the expiration notification). Other implementations can add queue functionality to the state data store 340 (e.g., a queue is commonly found in many concurrent programs). Rather than dealing with read/write pointers, and locking them to ensure only a single reader or writer at a simple, being able to enqueue and dequeue (with support in the data store) can enable network functions to be much more efficient in terms of accesses to the data store.

Some embodiments can integrate the state data store 340 into the network function nodes. While some implementations can consider the state data store 340 as a remote node, other implementations can integrate the state data store 340 nodes and the network function nodes. One feature of such an approach is that it can reduce latency and increase bandwidth to access data (like a cache). Unlike a cache, the data store nodes' functionality is to replicate data for resilience, but not provide consistency across all accessing nodes. That is, with a caching architecture, each node accesses data and caches it locally. This, in turn, relies on a mechanism to maintain cache coherency. With an integrated data store, access to data goes to the nodes actually storing that data (which may be replicated among a few nodes, and coherency needs to be maintained between that small subset of nodes). This can provide more scalability. Another feature of such an approach is that, if replication is not used for fault tolerance, this can effectively reproduces the architectures which used migration of data from within the network functions to other instances. It does so, however, with a general data store, moving the burden from every network function implementation to a common data store (which, of course, would involve the data store including the ability to control data placement).

Figure 6:
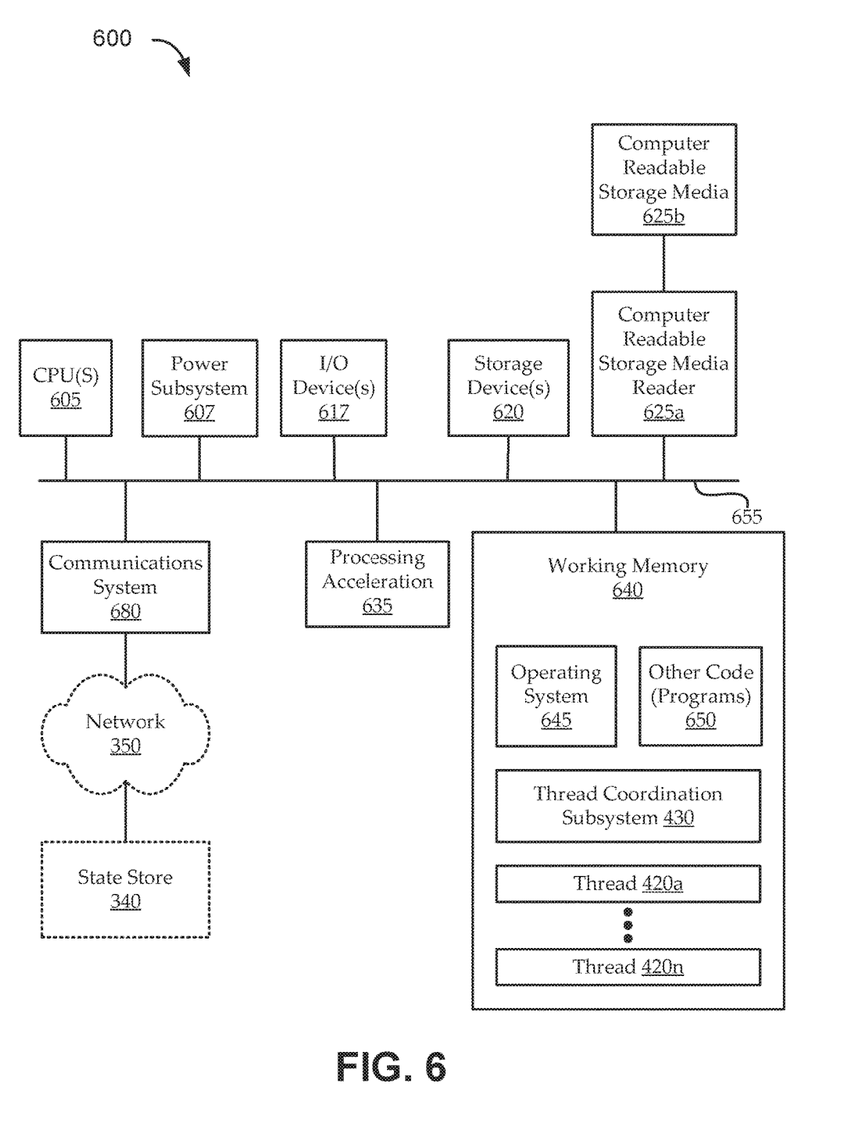
FIG. 6 shows an exemplary computational environment for implementing StatelessNF according to various embodiments.

FIG. 6 shows an exemplary computational environment 600 for implementing StatelessNF, according to various embodiments. For example, the computational environment 600 can be an implementation of some or all of the systems of FIG. 3 or 4. The computational environment 600 can be implemented as or embodied in single computer systems, distributed computer systems, or in any other useful way. For example, the computational environment 600 can include one or more virtual machines, one or more processor cores, etc. The computational environment 600 is shown including hardware elements that may be electrically coupled via a bus 655.

The hardware elements may include one or more central processing units (CPUs) and/or other processor(s) 605. As used herein, a "processor" can generally refer to multiple processors, multiple cores, multiple processing pipelines, etc. In some embodiments, the computational environment 600 can also include a processing acceleration unit 635, which can include a digital signal processor (DSP), special-purpose processor, and/or the like. In some implementations, the processing acceleration unit 635 includes one or more types of acceleration software. Implementations can also include one or more input/output devices 610. For example, the input/output devices 610 can include one or more network interface devices (NICs, etc.), user interface devices, etc. Some implementations also include a power subsystem 607, including any suitable power storage, power electronics, power interfaces, etc.

Some implementations can permit data to be exchanged, via a communications subsystem 680, with one or more networks and/or any other computer or external system. The communications subsystem 680 can include a modem, a network card (wireless or wired), an infrared communication device, and/or any other suitable components or combinations thereof. In some implementations, the communications subsystem 680 permits communications between the computational environment 600 and a separate (remote) state data store 340 (e.g., via a network 350). Sonic implementations use the communications subsystem 680 to facilitate distributed processing over multiple computational environments.

The computational environment 600 can also include one or more storage devices 620. By way of example, storage device(s) 620 may be disk drives, optical storage devices, solid-state storage device such as a random access memory (RAM) and/or a read-only memory (ROM), which can be programmable, flash-updateable and/or the like. For example, the storage devices 620 can include a buffer pool, or the like. The computational environment 600 can additionally include a computer-readable storage media reader 625a, and working memory 640, which may include RAM and ROM devices as described above. The computer-readable storage media reader 625a can further be connected to a computer-readable storage medium 625b, together (and, optionally, in combination with storage device(s) 620) comprehensively representing remote, local, fixed, and/or removable storage devices plus storage media for temporarily and/or more permanently containing computer-readable information.

In some embodiments, the computational environment 600 can also include software elements, shown as being currently located within a working memory 640, including an operating system 645 and/or other code 650. For example, embodiments can he implemented as instructions, which, when executed by one or more processors 605, cause the processors 605 to perform certain functions. Such functions can include StatelessNF functionality, as described above. For example, some embodiments of the working memory 640 can be used to implement the thread coordination subsystem 430 and the multiple parallel threads 420. In some such embodiments, the instructions can cause the processor(s) 605 to perform steps including: receiving multiple state requests from multiple parallel threads of a virtualized state-reliant network function, each state request associated with a respective one of multiple input packets being processed by the parallel threads; batching the state requests into a coordinated state request; communicating the coordinated state request over a network to a remote state data store; receiving a coordinated state response from the remote data store over the network in response to the coordinated state request; and outputting, in accordance with the received coordinated state response, a number of processed packets corresponding to the input packets.

A software module can be a single instruction, or many instructions, and can be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave. Alternate embodiments of a computational environment 600 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 600 may include code 650 for implementing embodiments as described herein. For example, while not shown as part of the working memory 640, certain functionality of other subsystems can be implemented with any suitable combination of hardware and software, including using code 650 stored in the working memory 640.

Figure 7:
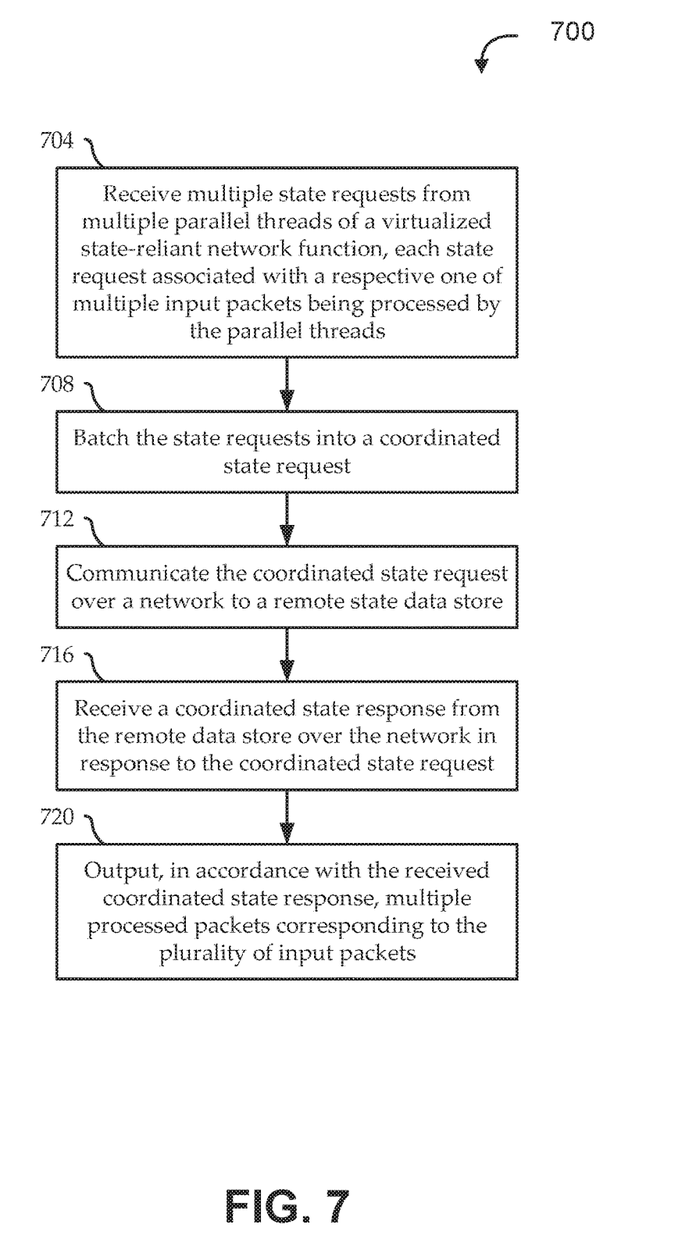
FIG. 7 shows a flow diagram for an illustrative method for stateless network function virtualization, according to various embodiments.

FIG. 7 shows a flow diagram for an illustrative method 700 for stateless network function virtualization, according to various embodiments. Embodiments of the method 700 begin at stage 704 by receiving multiple state requests from multiple parallel threads of a virtualized state-reliant network function, each state request associated with a respective one of multiple input packets being processed by the parallel threads. At stage 708, embodiments can batch the state requests into a coordinated state request. At stage 712, embodiments can communicate the coordinated state request over a network to a remote state data store. At stage 716, embodiments can receive a coordinated state response from the remote data store over the network in response to the coordinated state request. At stage 720, embodiments can output, in accordance with the received coordinated state response, a number of processed packets corresponding to the input packets.

The methods disclosed herein include one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system comprising:
   one or more processors; and
   one or more non-transitory computer-readable media storing computing instructions configured to run on the one more processors and provide a stateless network middlebox system, the stateless network middlebox system comprising:
      a thread coordination subsystem comprising:
         a plurality of state request inputs;
         a coordinated request output; and
         a coordinated reply input; and
      a plurality of parallel threads, each associated with a state-reliant network function, and each having:
         a thread input;
         a state request output responsive to the thread input and coupled with a respective one of the plurality of state request inputs;
         a state data input responsive to the coordinated reply input; and
         a thread output responsive to application of the thread input and the state data input to the state-reliant network function associated with a respective one of the plurality of parallel threads, wherein:
the coordinated reply input is responsive to state data received from a state data store in response to the coordinated request output, and the coordinated request output is generated as a coordinated batching of the plurality of state request inputs, the state data store being located outside the stateless network middlebox system;
the state data is devoid of being stored locally in the stateless network middlebox system across packets in processing a flow of the packets, such that the plurality of parallel threads remain stateless; and
the state data is requested from the state data store in response to the coordinated request output to provide the state data to the plurality of parallel threads.

2. The system of claim 1, wherein the thread coordination subsystem further comprises:
a request batcher having the coordinated request output and the plurality of state request inputs; and
a buffer pool coupled with the request batcher and comprising pre-allocated memory to store state requests received via the plurality of state request inputs for the coordinated batching.

3. The system of claim 1, wherein:
the state data store is in data communication with the coordinated request output and the coordinated reply input via a data network, the state data store having stored thereon the state data associated with a plurality of state-reliant network functions,
such that, in response to the coordinated request output, the coordinated reply input indicates the state data stored in the state data store in relation to the state-reliant network function associated with the plurality of parallel threads.

4. The system of claim 1, wherein:
the thread coordination subsystem further comprises a plurality of state data memory locations responsive to the coordinated reply input; and
the state data input comprises a pointer to an associated one of the plurality of state data memory locations.

5. The system of claim 1, wherein each of the plurality of parallel threads further comprises:
a first sub-thread having the thread input and a packet queue coupled with the thread input; and
a second sub-thread coupled with the packet queue and having the state request output, the state data input, and the thread output.

6. The system of claim 1, further comprising:
a packet scheduling subsystem comprising a packet input and a plurality of packet outputs, each packet output coupled with a respective one of the thread inputs.

7. The system of claim 6, wherein:
the packet input of the packet scheduling subsystem is communicatively coupled with a data network; and
the thread output of each of the plurality of parallel threads is communicatively coupled with the data network.

8. The system of claim 6, wherein the packet outputs of the packet scheduling subsystem are responsive to the packet inputs in compliance with a single root input/output virtualization interface.

9. The system of claim 1, wherein each of the plurality of threads is processed by a respective core of a multi-core processing system.

10. The system of claim 1, wherein each of the plurality of threads is processed by a parallel pipeline of a virtual machine.

11. A method for stateless network function virtualization, the method comprising:
receiving a plurality of state requests from a plurality of parallel threads of a virtualized state-reliant network function, each of the plurality of state requests being associated with a respective one of a plurality of input packets being processed by the plurality of parallel threads;
batching the plurality of state requests into a coordinated state request;
communicating the coordinated state request over a network to a state data store to request state data from the state data store, the state data store being located outside the virtualized state-reliant network function;
receiving a coordinated state response from the data store over the network in response to the coordinated state request; and
outputting, in accordance with the coordinated state response, a plurality of processed packets corresponding to the plurality of input packets,
wherein:
the state data is devoid of being stored locally in the virtualized state-related network function across packets in processing a flow of the packets, such that the plurality of parallel threads remain stateless; and
the state data is requested from the state data store by the coordinated state request to provide the state data to the plurality of parallel threads to generate the plurality of processed packets.

12. The method of claim 11, further comprising:
pre-allocating a plurality of local buffers;
associating a pointer from each of the plurality of parallel threads to a respective one of the plurality of local buffers; and
storing the coordinated state response in one of the plurality of local buffers upon receipt.

13. The method of claim 11, wherein:
each of the plurality of state requests comprises a key generated according to contents parsed from the respective one of the plurality of input packets; and
communicating the coordinated state request comprises communicating a coordinated key generated according to the keys of the plurality of state requests that are associated with the coordinated state request, the state data store storing the state data that is indexed in accordance with the coordinated key.

14. The method of claim 11, further comprising:
receiving the plurality of input packets into queues of the plurality of parallel threads such that each of the queues buffer queued packets;
parsing, by each of the plurality of parallel threads, each of the queued packets to decode respective packet contents; and
generating, by each of the plurality of parallel threads, the plurality of state requests according to the respective packet contents, as decoded.

15. The method of claim 11, further comprising:
receiving the plurality of input packets from a data network as received input packets; and
distributing the received input packets to the plurality of parallel threads according to a scheduling schema.

16. The method of claim 15, wherein the outputting is to the data network.

17. A stateless network middlebox system comprising:
a processor; and
a memory having instructions stored thereon, which, when executed, cause the processor to perform:
 receiving a plurality of state requests from a plurality of parallel threads of a virtualized state-reliant network function, each of the plurality of state requests being associated with a respective one of a plurality of input packets being processed by the plurality of parallel threads;
 batching the plurality of state requests into a coordinated state request;
 communicating the coordinated state request over a network to a state data store to request state data from the state data store, the state data store being located outside the virtualized state-reliant network function;
 receiving a coordinated state response from the data store over the network in response to the coordinated state request; and
 outputting, in accordance with the coordinated state response, a plurality of processed packets corresponding to the plurality of input packets,
 wherein:
  the state data is devoid of being stored locally in the virtualized state-related network function across packets in processing a flow of the packets, such that the plurality of parallel threads remain stateless; and
  the state data is requested from the state data store by the coordinated state request to provide the state data to the plurality of parallel threads to generate the plurality of processed packets.

18. The system of claim 17, wherein:
the processor is in data communication with the state data store via the network.

19. The system of claim 17, wherein the instructions further cause the processor to perform:
 pre-allocating a plurality of local buffers;
 associating a pointer from each of the plurality of parallel threads to a respective one of the plurality of local buffers; and
 storing the coordinated state response in one of the plurality of local buffers upon receipt.

20. The system of claim 17, wherein:
 each of the plurality of state requests comprises a key generated according to contents parsed from the respective one of the plurality of input packets; and
 communicating the coordinated state request comprises communicating a coordinated key generated according to the keys of the plurality of state requests that are associated with the coordinated state request, the state data store storing the state data that is indexed in accordance with the coordinated key.

* * * * *